(12) United States Patent
Vigouroux et al.

(10) Patent No.: US 8,167,432 B2
(45) Date of Patent: May 1, 2012

(54) METHOD TO DISPLAY IMAGES USING METAMERISM TO PREVENT ILLEGAL COPY

(75) Inventors: Jean-Ronan Vigouroux, Rennes (FR); Jean-Jacques Sacre, Chateaugiron (FR); Sylvain Thiebaud, Noyal sur Vilaine (FR)

(73) Assignee: Thomson Licensing, Issy-les-Moulineaux (FR)

( * ) Notice: Subject to any disclaimer, the term of this patent is extended or adjusted under 35 U.S.C. 154(b) by 413 days.

(21) Appl. No.: 12/450,085

(22) PCT Filed: Mar. 11, 2008

(86) PCT No.: PCT/EP2008/052882
§ 371 (c)(1),
(2), (4) Date: Sep. 10, 2009

(87) PCT Pub. No.: WO2008/110557
PCT Pub. Date: Sep. 18, 2008

(65) Prior Publication Data
US 2010/0091200 A1 Apr. 15, 2010

(30) Foreign Application Priority Data
Mar. 13, 2007 (EP) ..................... 07300857

(51) Int. Cl.
*G03B 21/14* (2006.01)

(52) U.S. Cl. ............. 353/31; 353/121; 352/42; 380/201

(58) Field of Classification Search .................... 353/31, 353/121, 122; 352/40, 41, 42, 44; 380/201; 349/5, 7, 8, 9
See application file for complete search history.

(56) References Cited

U.S. PATENT DOCUMENTS

| | | | |
|---|---|---|---|
| 6,648,475 B1 * | 11/2003 | Roddy et al. | 353/31 |
| 7,362,336 B2 * | 4/2008 | Miller et al. | 345/589 |
| 2003/0234911 A1* | 12/2003 | Horvath et al. | 353/31 |
| 2004/0150794 A1* | 8/2004 | Kurtz et al. | 353/31 |
| 2008/0187247 A1* | 8/2008 | Bilobrov et al. | 382/302 |
| 2009/0108182 A1* | 4/2009 | Thiebaud et al. | 250/215 |
| 2010/0033684 A1* | 2/2010 | Thiebaud et al. | 353/31 |

FOREIGN PATENT DOCUMENTS

| | | |
|---|---|---|
| EP | 1414250 | 4/2004 |
| WO | WO 99/24964 | 5/1999 |
| WO | WO 2004/040899 | 5/2004 |
| WO | WO 2005/027529 | 3/2005 |
| WO | WO 2006/076174 | 7/2006 |

OTHER PUBLICATIONS

Search Report Dated May 23, 2008.

* cited by examiner

*Primary Examiner* — William C Dowling
(74) *Attorney, Agent, or Firm* — Myers Wolin, LLC

(57) ABSTRACT

A method to display images using four or more different primaries having different spectral distributions wherein, in the LMS color space, at least two of these primaries have the same L coordinates and the same M coordinates; thank to the invention, different metamers, when being legally displayed, will be not only perceptually indistinguishable to a viewer with normal color vision but also indistinguishable by most of the viewers with non-normal color vision.

12 Claims, 7 Drawing Sheets

METHOD TO DISPLAY IMAGES USING METAMERISM TO PREVENT ILLEGAL COPY

This application claims the benefit, under 35 U.S.C. §365 of International Application PCT/EP2008/052882, filed Mar. 11, 2008, which was published in accordance with PCT Article 21(2) on Sep. 18, 2008 in English and which claims the benefit of European patent application No. 07300857.5, filed Mar. 13, 2007.

The invention relates to a method to display images that provides an efficient anti-copy protection.

Colour images are generally displayed using three primaries: red, green and blue; the document WO2006/076174 (KODAK) discloses a display device having four primaries that are capable of producing metamerically matched color stimuli; using this display device, spatial or sequential portions of an image or of a series of images (image sequence) are processed such that visually equivalent colors in two or more of these image portions are displayed by different combinations of primaries that differ globally in their spectral distribution. Such visually equivalent colors are then considered as metameric for the human eyes.

Metameric colors are defined as colors having the same coordinates in a visual color space (i.e. the same visual color) although having different spectral wavelength distribution. Consequently, colors that are metameric have the same coordinates in visual color spaces, as the 1931-CIE XYZ color space or the perceptually uniform LAB or LUV color spaces, and cannot then be differentiated by the human eye, although they have different spectral distributions. By extension, colors can be considered as metameric for a given color device, as an image capture device or a printing or display device, if these colors, although having different spectral distribution, have the same coordinates in a color space which is associated with this device; such a device cannot differentiate colors that are metameric for this color device.

Such an image display method, when used in a projection display in a movie theater, can be very useful to defeat camcorder piracy, as disclosed in WO2006/076174 (already quoted), WO2004/040899 (Qdesign), EP1590783 (PHILIPS) and EP1414250 (SONY). As a matter of fact, if at least some portions or images of image sequences are displayed using colors that are metameric for the human eye but not metameric for the image capture device, the captured images or image sequences would be then seriously jammed, then preventing their piracy. WO2005/027529 discloses another anti-piracy displaying method which is not based on metamerization, but on temporal jamming of images based the decomposition of each image to display into sub-images of different colors.

As stated page 20, line 1-19 of WO2006/076174, colors that are metameric in a visual color space, although having different spectral distributions, will be "perceptually indistinguishable to a viewer with normal color vision when viewed under equivalent conditions"; unfortunately, "normal variation among viewers may result in varying degrees of color difference to each individual"; then, using metamerism to display images as disclosed in the already quoted prior art documents, variations that will be perceptually indistinguishable to a viewer with normal color vision would in fact be distinguishable by viewers with non-normal color vision; as about 4.25% of viewers (8% of men+0.45% of women) have non-normal color vision, a significant part of the viewers will be prevented to visualize correctly the displayed images. WO99/24964 discloses an image display method that is adapted to enhance the color differences that cannot be enough perceived by viewers with non-normal color vision.

An object of the invention is to limit the above-mentioned drawback.

For this purpose, the subject of the invention is a method to display an image or a series of images using four or more different primaries having different spectral distributions wherein, in the LMS color space, at least two of these primaries have the same L coordinates and the same M coordinates.

Preferably, all said primaries except two of them have the same L coordinates and the same M coordinates. It allows advantageously, notably when there are more than four primaries, to produce metameric effects which remain perceptually as indistinguishable as possible to the very large majority of viewers.

It has to be pointed out that although an object of the invention is notably to render the anti-piracy methods based on metamerism undistinguishable to most of the viewers with color visual deficiency, notably concerning the $C_L$ and $C_M$ cones of the human eyes (see details below), the invention is directed to a specific method of displaying images, whatever there is actually or not a camcorder trying to capture the images that are displayed according to the invention. It has to be pointed out that although the invention allows viewers with non-normal color vision to visualize correctly the displayed images (contrary to the prior art), the invention allows viewers with normal color vision to visualize still correctly the displayed images (as in the prior art).

A primary corresponds to a light having a specific spectral distribution of its intensity; images to display are spatially partitioned into pixels; each pixel is spatially or sequentially divided into sub-pixels, one sub-pixel for each primary; each sub-pixel of an image is generally provided by the amplitude modulation or the temporal modulation of its associated primary.

When using a display device having for instance four primaries R, G1, G2, B to implement this method, each color pixel of an image to display is associated with at least one multiplet $C=(C_R, C_{G1}, C_{G2}, C_B)$ consisting of the four coordinates $C_R, C_{G1}, C_{G2}, C_B$ of this color pixel in the color space RG1G2B which is associated with this display device; because more than three primaries are available to display each pixel, one pixel can generally be associated with a plurality of multiplets C, C', C" . . . that are then metameric, then allowing to display identical color pixels with different metameric multiplets; if these different multiplets that are metameric in the display device color space are actually not metameric in the color space of a camcorder, these identical color pixels, after being displayed, will be captured by this camcoder as colors being visually different, then inferring the jamming of images that is expected to dissuade illegal copy; advantageously, when using at least two primaries having the same L coordinates and the same M coordinates to display images according to the invention, metamers having different multiplets will be not only perceptually indistinguishable to a viewer with normal color vision but also indistinguishable by most of the viewers with non-normal color vision, as explained in more detailed below.

The spectral sensitivities of the three types $C_L$, $C_M$, $C_S$ of retinal cones of the human eye with a standard vision have been actually known for only for a few years, giving respectively three colorimetric functions $L(\lambda)$, $M(\lambda)$, $S(\lambda)$ having their maximum respectively in long, middle and short wavelengths of the visible spectrum; this three colorimetric functions $L(\lambda)$, $M(\lambda)$, $S(\lambda)$ are illustrated on FIG. 1 and differs from the three colorimetric functions $X(\lambda), Y(\lambda), Z(\lambda)$ of the 1931CIEXYZ standard color space; on these three colorimetric functions $L(\lambda)$, $M(\lambda)$, $S(\lambda)$, a so-called LMS color space have been build, that is directly related to the sensitivity of the different cones of a human eye with a standard vision; the coordinates L, M, S of any color having its spectral distribution $C(\lambda)$ may then be calculated using these three functions and may be regarded as directly related to the signals emitted by each type $C_L$, $C_M$, $C_S$ of cones. The advantage of LMS visual colorimetry, compared to other visual colorimetry, is its direct bond with the three actual retinal signals which are at the origin of perceptions of the color by the human eye.

As already mentioned previously, quite a significant part of the human eyes of actual viewers depart from the so-called "standard" or "normal" vision:

3.15% of human beings (5.9% of men+0.4% of women) have a partial deficiency for one type of cone (in majority L or M deficiency) and are called "anomalous trichromats"; for these people, the presence of abnormal pigments causes a displacement of one of the curves of absorption of the cones which tends to reduce the differences in colors compared to people that perceive normally the colours;

1.07% of human beings (2.105% of men+0.043% of women) have a total deficiency for one type of cone (in majority L or M missing) and are called "dichromats"; these people have only two types of cones; according to the type $C_L$, $C_M$, $C_S$ of missing cones, we classifies dichromats in three categories: protanop (L cones missing), deuteranop (M cones missing), and tritanop (S cones missing);

0.0013% of human beings (0.0025% of men+<<0.001% of women) have a total deficiency for two types of cone and are called "monochromats".

Table 1 below gives a more detailed statistical distribution of these human vision anomalies among men and women.

From this table, we see that 4.225% of human eyes depart from the standard color vision, with about 0.005% of human beings having a color visual deficiency concerning the CS cones (S deficiency or S missing), and the remaining 4.22% of human beings having a color visual deficiency concerning the CL and CM cones (L and/or M deficiency or L and/or M missing). Thank to the invention, when using at least two primaries having the same L coordinates and the same M coordinates to display images, metamers having different multiplets will be not only perceptually indistinguishable to a viewer with normal color vision but also indistinguishable by viewers having a color visual deficiency concerning the CL and CM cones, i.e. by most of the viewers with non-normal color vision.

Preferably, in said LMS color space, said primaries having the same L coordinates and the same M coordinates do not have the same S coordinates. In this situation, the at least two primaries with identical L and M coordinates in the LMS visual color space are then not metameric. As in the already quoted prior art documents, the metamerization effect is then obtained by using different combination of the four or more different primaries to display the same visual color. As there is only about 0.005% of human beings having a color visual deficiency concerning the $C_S$ cones, metamers having different multiplets will be still perceptually indistinguishable to the very large majority of viewers.

In a variant, said primaries having the same L coordinates and the same M coordinates are also metameric in a visual color space. It allows then advantageously to produce the metameric effects as detailed below, without specific reprocessing of the image data, as disclosed in the pending patent application EP7300858.3 filed on Mar. 13, 2007.

Preferably, notably when said primaries having the same L coordinates and the same M coordinates are not metameric in a visual color space, the display method comprises the processing of portions of said image or series of image such that visually equivalent colors, i.e. metameric colors, in two or more of these portions are displayed by using different combinations of said primaries that differ globally in their spectral distribution.

Such a processing will not be detailed because it is already basically known from documents WO2006/076174, WO2004/040899, EP1590783 and EP1414250 (already cited). Such a processing alters the spectral content of the images to display in a manner that is metameric to the human eye, i.e. in a visual color space such as LMS, XYZ, Lab or Luv color spaces; such alterations to the visual images are imperceptible to the human eye, even, thanks to the invention, to the high majority of human eyes that have color deficiencies. Portions of images that are processed may concern the entire images. The altering of the spectral content of images is performed in a manner that is hopefully not metameric to an image capture device, i.e. in a camcorder color space, then allowing the prevention of illegal copy of these images by this image capture device. Such an image capture device would have hopefully a spectral sensitivity that is different from the spectral sensitivity of the human eye. Consequently, the alterations to the visual images, which are imperceptible to the human eye because of the visual metamerization effect, are indeed perceptible when viewing a copy of the displayed images that are captured by the image capture device.

According to a first variant, said processing includes temporally varying the spectral content of time sequential multiple frames.

According to a second variant, said processing includes both spatially varying the spectral content across the visual image and temporally varying the spectral content of time sequential multiple frames.

Both variants can be combined in different ways.

The subject of the invention is also a display device comprising four or more primaries having different spectral distribution, that is able to implement a method according to the invention, wherein, in the LMS color space, at least two of the primaries have the same L coordinates and the same M coordinates. These primaries can be spatially distributed on the surface of an imager, as on a direct view Liquid Display Device or a Plasma Panel; these primaries can be distributed on different channels as in a projection display having a beam splitter to distribute these primaries from a single light source, or having a specific light source for each primary (or a combination of both architectures); these primaries can be

TABLE 1 statistical distribution of human vision anomalies

| Human vision anomalies | characteristics | | Men | Women |
|---|---|---|---|---|
| | | Total: | 8.007% | 0.443% |
| Monochromats | 2 cones missing | | 0.0025% | <<0.001% |
| Dichromats | | Total: | 2.105% | 0.043% |
| " | L missing | Protanops | 1.000% | 0.020% |
| " | M missing | Deuteranops | 1.100% | 0.020% |
| " | S missing | Tritanops | 0.005% | 0.003% |
| Anomalous Trichromats | | Total: | 5.900% | 0.400% |
| Anomalous Trichromats | L deficiency | Protanomaly | 1.000% | 0.020% |
| Anomalous Trichromats | M deficiency | Deuteranomaly | 4.900% | 0.380% |
| Anomalous Trichromats | S deficiency | Trianomaly | <0.001% | <<0.001% | sequentially distributed as in a projection display having only one spatial modulation channel with a micro-imager (as a micromirror device) but a color wheel to perform this sequential distribution on the micro-imager. Spatial distribution and sequential distribution can be combined without departure from the invention.

According to a first variant, the display device is a projection display device that comprises at least one light source and an optical separator/recombinator that is adapted to spatially split the light emitted by the at least one source into four or more different beams, each beam having the spectral distribution of one primary. Each beam can be then spatially modulated to get the displayed image. Preferably, the optical separator/recombinator comprises three dichroïc filters.

According to second variant, the display device is a projection display device that comprises at least one light source, at least one spatial modulator, and a color wheel that is adapted to sequentially distribute the light emitted by the at least one light source on the at least one spatial modulator according to a sequence comprising a plurality of said primaries.

Preferably, in either the first variant or the second variant, the at least one light source comprises a plurality of light sources including at least a laser source.

The invention will be more clearly understood on reading the description which follows, given by way of non-limiting example and with reference to the appended figures in which.

A process to choose four primaries according to one embodiment of the invention will now be described; then, the effect of these primaries on different usual camcorder will be detailed; finally, different advantageous projection display devices that are able to implement the invention will be described.

Choice of Four Primaries According to One Embodiment of the Invention

Figure 1:
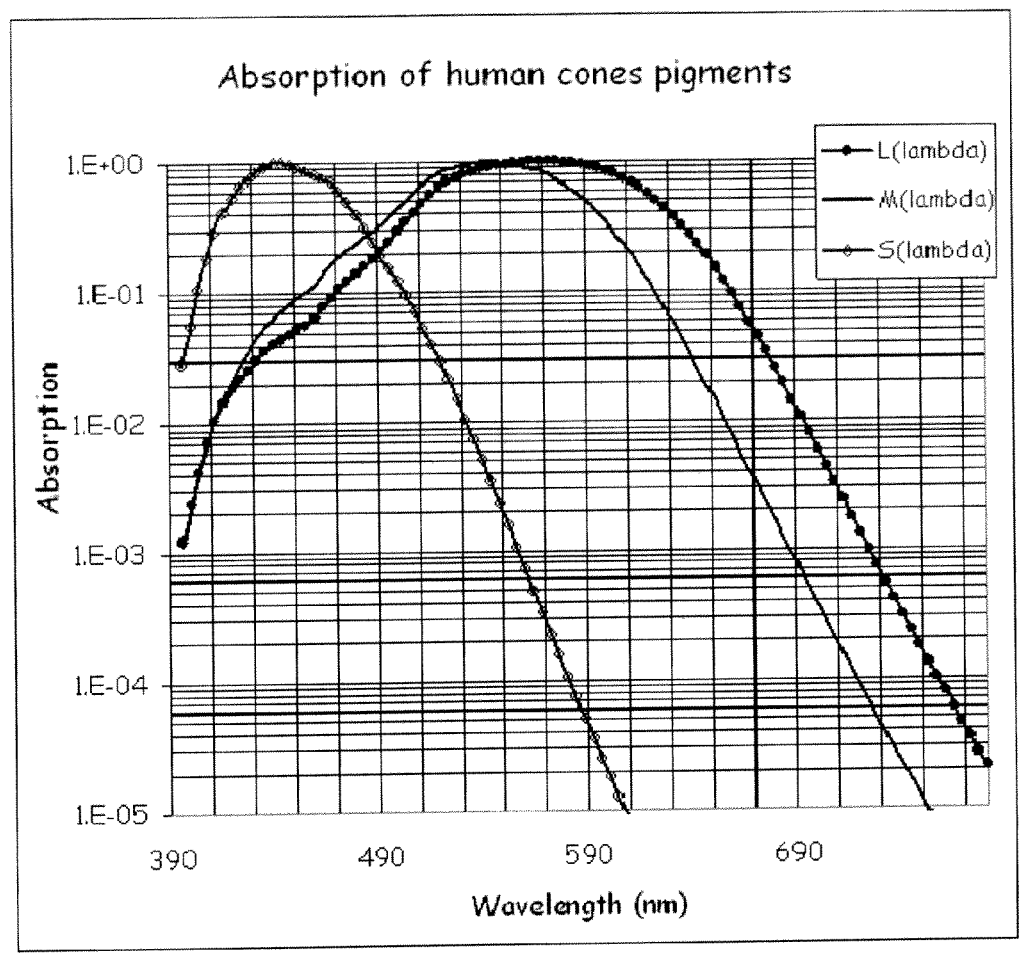
FIG. 1 illustrates the three colorimetric functions $L(\lambda)$, $M(\lambda)$, $S(\lambda)$ of the LMS color space.
Figure 2:
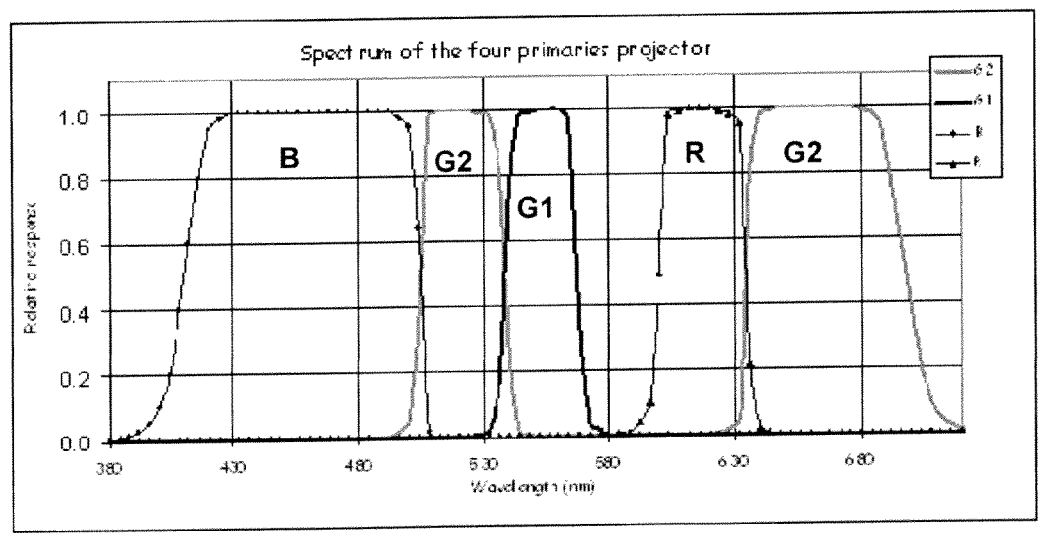
FIG. 2 illustrates the spectral distribution of the four primaries that are used to implement the invention according to a preferred embodiment.
Figure 3:
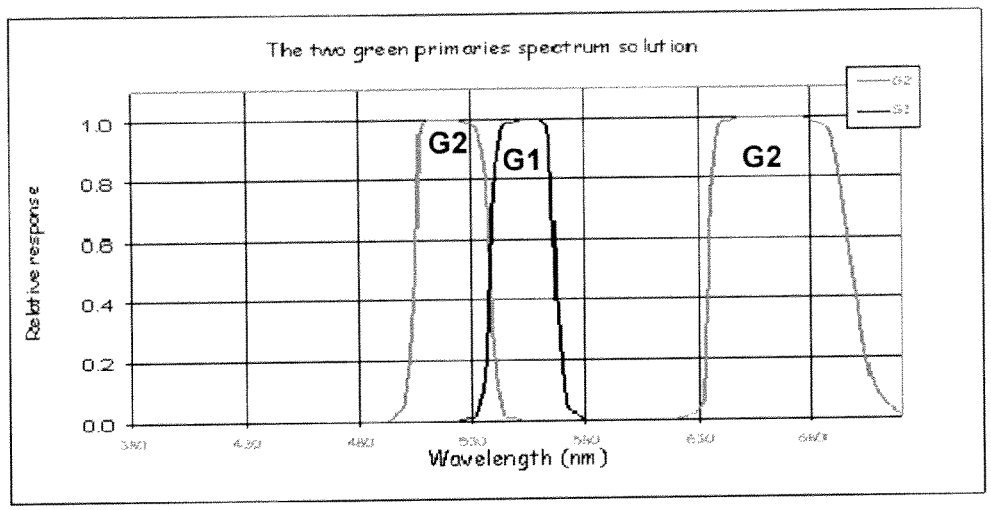
FIG. 3 illustrates the spectral distribution of G1 and G2 primaries of FIG. 1.

As illustrated in FIG. 2, it is proposed to add one green primary G2 to the usual three primaries R, G1, B that are used to display images in a usual display device of the prior art; several embodiments of display device will be described below; in complement to the usual green primary G1, another green primary G2 is added that contains, in addition to the green color itself, a "deep" red (the longest wavelength of the red), as illustrated on FIG. 3; more precisely, the distribution of wavelength of the primaries are as follows: blue primary B from UV to 504 nm; G1 primary from 540 nm to 570 nm; G2 primary from 504 nm to 540 nm with the deep red from 644 nm to IR; red primary from 596 to 644 nm.

According to the invention, the two green primaries G1 and G2 are to be selected in such a way that the following equations are satisfied:

$$L_G = \int_{\lambda 1}^{\lambda 2} L_\lambda \times G1_\lambda d\lambda$$
$$= \int_{\lambda 1}^{\lambda 2} L_\lambda \times G2_\lambda d\lambda$$

and $$M_G = \int_{\lambda 1}^{\lambda 2} M_\lambda \times G1_\lambda d\lambda$$
$$= \int_{\lambda 1}^{\lambda 2} M_\lambda \times G2_\lambda d\lambda$$

with:

$L_G$ and $M_G$ are the "L" and "M" coordinates that are, according to the invention, identical for the two primaries G1 and G2, in the LMS color space and correspond to the stimuli on the cones $C_L$, $C_M$ sensitive respectively to long and middle wavelengths, (here, the "S" coordinates are different)

Figure 4:
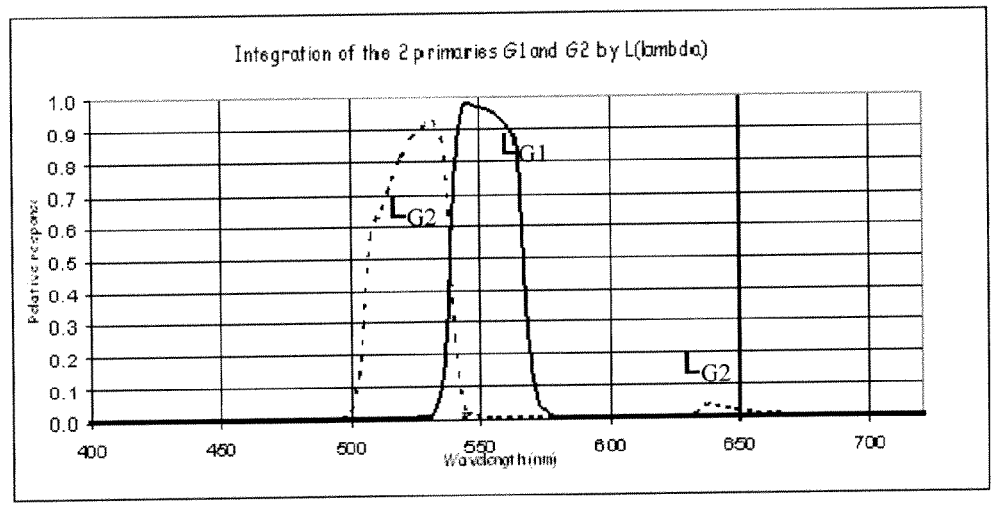
FIG. 4 illustrates the spectral convolution of the colorimetric functions $L(\lambda)$ of FIG. 1 with the spectral distribution of G1 and G2 primaries of FIG. 3.
Figure 5:
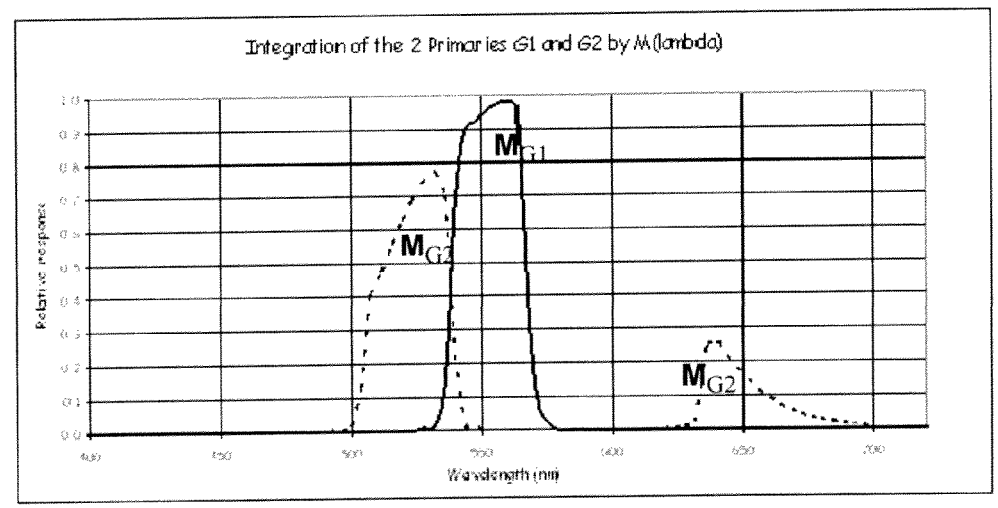
FIG. 5 illustrates the spectral convolution of the colorimetric functions $M(\lambda)$ of FIG. 1 with the spectral distribution of G1 and G2 primaries of FIG. 3.

$L_\lambda$: colorimetric function of the L coordinate, in the LMS color space, related to the average absorption of the cones pigments of long wavelength $C_L$, $M_\lambda$: colorimetric function of the M coordinate, in the LMS color space, related to the average absorption of the cones pigments of middle wavelength $C_M$;

$G1_\lambda$, spectral distribution of the first green primary G1, $G2_\lambda$, spectral distribution of the second green primary G2;

FIG. 4 illustrates the spectral functions $L_G \times G1_\lambda$ and $L_G \times G2_\lambda$: it can be seen on this figure that the areas under each function are equal. FIG. 5 illustrates the spectral functions $M_G \times G1_\lambda$ and $M_G \times G2_\lambda$: it can be seen on this figure that the areas under each function are equal too. In the calculation of the spectra of the G1 and G2 primaries, it is supposed in this embodiment that they result from only one illuminant and that they are differentiated in wavelength and superposes themselves only in the proximity of the cutting wavelengths.

A study with an equienergy spectrum as input shows that there is indeed a solution to both equations above; there is indeed a solution which satisfies with a very good approximation the two equations and which moreover is compatible with the use of the deep red. To find this solution, a cut of a band of about 20 nm between 570 and 590 nm of the 260 nm useful visible band have to be accepted; to find the red primary color R that is compatible with these four primaries system, a partial loss of the spectrum between 570~572 nm to 590~592 nm have to be accepted. Such choices may infer a slight loss of energy as exemplified for instance for a xenon lamp used as the illuminant having a range of useful quasi-equi-energical wavelengths between 420 nm and 680 nm: the loss of power at exit of the lamp will be approximately 8% of what it would be without the so-called cut in the spectrum. It should be noted that the loss of brightness will be around 15%.

Figure 6:
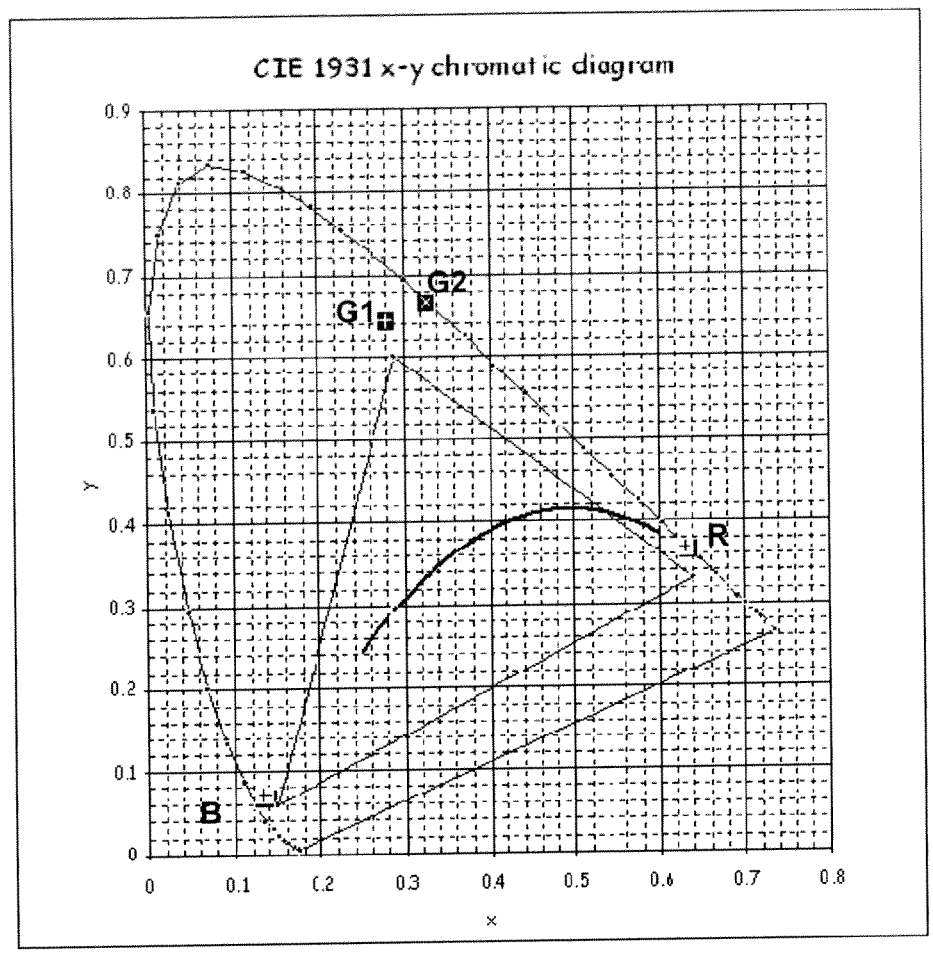
FIG. 6 illustrates the coordinates of the four primaries of FIG. 2 in the 1931CIE[xy] color space.

Using the display device having these four primaries R, G1, G2, B will advantageously allow to display different metameric colors that will be not only perceptually indistinguishable to a viewer with normal color vision but also indistinguishable by viewers having a color visual deficiency concerning the $C_L$ and $C_M$ cones; as explained in detail in the next paragraph, such a display device is very efficient to prevent illegal copy from camcorders trying to capture the images that are displayed by this display device. Another advantage of this particular disposition of primaries is the increase of the gamut of the projector, as illustrated on FIG. 6 which shows the color coordinates x, y of each primary derived from the 1931CIEXYZ color space. It can be seen on this figure that the two primaries G1 and G2 are not visually equivalent, i.e. are not metameric in the Yxy visual color space, although they have approximately the same coordinates L and M in the LMS visual color space.

Effect of these Four Primaries on a Camcorder:

In this paragraph we will approach the aspect of the effectiveness of the jamming of a camcorder or a camera which would film the image generated by using the display device having the four primaries described in previous paragraph, two of which G1, G2 having the same L coordinates $L_G$ and the same M coordinates $M_G$ in the LMS color space.

Figure 7:
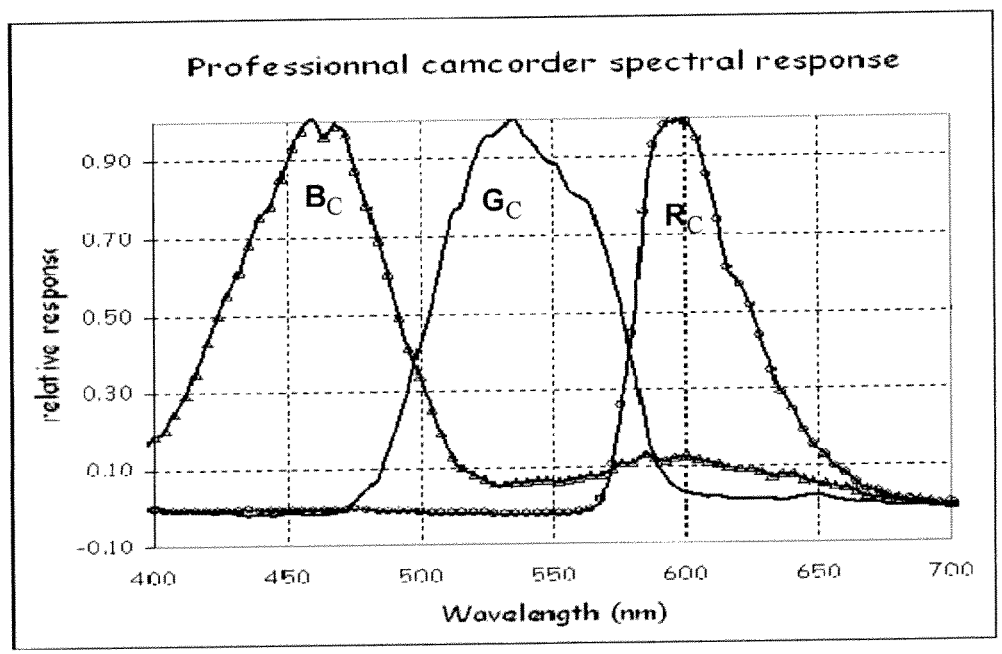
FIG. 7 illustrates the spectral response of a professional camcorder.

To make simulations of such image capture by a camcorder, we will use a professional camera having one image sensor, here a CCD, for each of the usual three primary color; the spectral response of each CCD is illustrated on FIG. 7: $R_C$ for the red, $G_C$ for the green, $B_C$ for the blue. The spectral response presents negative values because the camera is equipped with a colorimetric masking.

Figure 8:
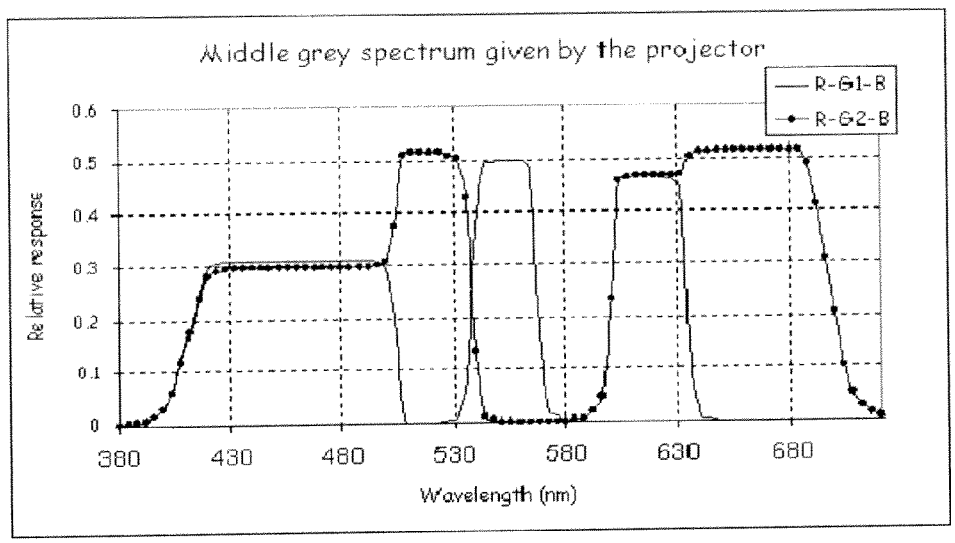
FIG. 8 illustrates the spectral distribution of two metameric colors that are "middle grey": Gr1 (straight line) and Gr2 (line with large dots)

Two different grey metameric colors are now chosen that give the same x, y coordinates in the CIE1931[x,y] color space but that have different spectral distribution as illustrated on FIG. 8: Gr1 having the straight line spectral distribution using the primaries R, G1 and B without using the primary G2; Gr2 having a spectral distribution drawn with a line having large dots using the primaries R, G2 and B without using the primary G1. The coefficients assigned to each primaries of the spectrum R, G1, B to display the color Gr1 were adjusted to obtain the same grey coordinates chromatic as the standard white D65 ($R_{Gr1}$=0.46875, $G1_{Gr1}$=0.5, $G2_{Gr1}$=0, and $B_{Gr1}$=0.311). The coefficients assigned to each primaries of the spectrum R, G2, B to display the color Gr2 where calculated using a spreadsheet by carrying out the equality X, Y, Z between the two different spectrums ($R_{Gr2}$=0.46870, $G1_{Gr2}$=0, $G2_{Gr2}$=0.51382, and $B_{Gr2}$=0.29740).

Figure 9:
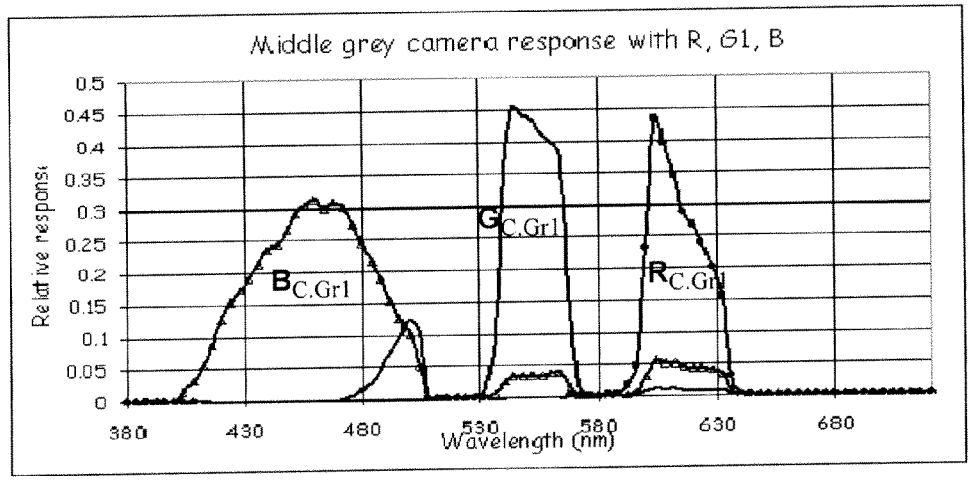
FIG. 9 illustrates the spectral convolution of the spectral distribution of the Gr1 color of FIG. 8 with the spectral response of FIG. 7.

The color which is captured by the camera when the primaries of the display device are set at the above values $R_{Gr1}$, $G1_{Gr1}$, $G2_{Gr1}$=0, and $B_{Gr1}$ corresponding to the grey Gr1 color is a grey color too ("middle grey"), because we made the assumption that, on this camera, the balance of the white was carried out on an actual white, and that the gain and the iris of the camera were adjusted in such a way that the white of brightness is 700 mV, then resulting for the same exit values for each primary of this camera: at the three video exits $R'_C$, $V'_C$, $B'_C$ of the camera, we get the same voltage 350 mV, or in digital values, the same value 128 (the maximum level being 255). FIG. 9 illustrates the spectral functions $R_{Gr1-\lambda}$=Gr1$_\lambda$× Rc$_\lambda$, $G_{Gr1-\lambda}$=Gr1$_\lambda$×Gc$_\lambda$ and $B_{Gr1-\lambda}$=Gr1$_\lambda$×Bc$_\lambda$; the area under these curves gives the three coordinates $R_{C.Gr1}$, $G_{C.Gr1}$, $B_{C.Gr1}$ of the 1$^{st}$ grey color Gr1 as captured by the camera.

Figure 10:
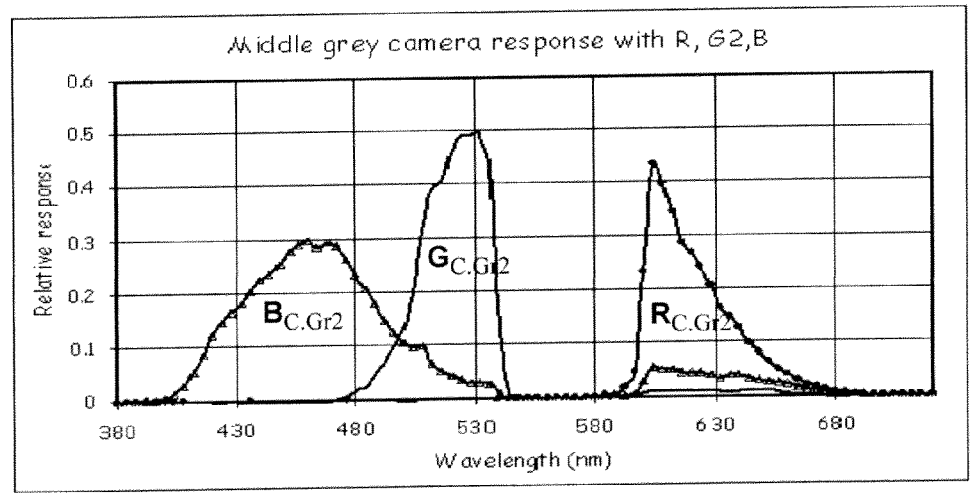
FIG. 10 illustrates the spectral convolution of the spectral distribution of the Gr2 color of FIG. 8 with the spectral response of FIG. 7.

FIG. 10 illustrates the spectral functions $R_{Gr2-\lambda}$=Gr2$_\lambda$× Rc$_\lambda$, $G_{Gr2-\lambda}$=Gr2$_\lambda$×Gc$_\lambda$ and $B_{Gr2-\lambda}$=Gr2$_\lambda$×Bc$_\lambda$; the area under these curves gives the three coordinates $R_{C.Gr2}$, $G_{C.Gr2}$, $B_{C.Gr2}$ of the 2$^{nd}$ grey color Gr2 as captured by the camera. The three digital video exits of the camera are then 161 for the red exit, 150 for the green exit, and 133 for the blue exit (255 being the maximum value). These values correspond to a color that is rather similar to a "yellow ochre" definitely different, as perceived by the human eye, from the previous "middle grey" from Gr1. The various video cameras than have been simulated give similar colors "yellow ochre" except the camera model CANON EOS 20D which gives a more "pink" color still far different from the "middle grey" Gr1.

We have now evidenced how two different grey metameric colors Gr1 and Gr2 that have originally the same x, y coordinates in the CIE1931[x,y] color space but different spectral distribution as displayed using the four primaries according to the invention, are perceived as different colors after being captured by a professional camera. More precisely, we can calculate the coordinates of these colors in the 1931CIEXYZ color space and then in the perceptually uniform Lab color space as they are captured by the camera, assuming the captured colors are displayed using a device that is compliant with standards EIA and is adjusted to provide a D65 white:

Gr1 color as captured by the camera:
Device color space: $R'_{C.Gr1}$=128, $G'_{C.Gr1}$=128, $B'_{C.Gr1}$=128,
CIEXYZ color space: $X_{C.Gr1}$=20,5175, $Y_{C.Gr1}$=21.5861, $Z_{C.Gr1}$=23.5072,
CIELab color space: $L^*_{C.Gr1}$=53.585, $a^*_{C.Gr1}$=0.032, $b^*_{C.Gr1}$=−0.062.

Gr2 color as captured by the camera:
Device color space: $R'_{C.Gr2}$=161, $G'_{C.Gr2}$=150, $B'_{C.Gr2}$=133,
CIEXYZ color space: $X_{C.Gr2}$=29.7319, $Y_{C.Gr2}$=30.9576, $Z_{C.Gr2}$=26.7159,
CIELab color space: $L^*_{C.Gr2}$=62.4713, $a^*_{C.Gr2}$=1.1748, $b^*_{C.Gr2}$=10.0879.

From these data, we can calculate the usual color difference $\Delta E^*$=13.49 between the two colors Gr1 and Gr2 as they are perceived, from the equation:

$$\Delta E^* = \sqrt{(L^*_{C.Gr2} - L^*_{C.Gr1})^2 + (a^*_{C.Gr2} - a^*_{C.Gr1})^2 + (b^*_{C.Gr2} - b^*_{C.Gr1})^2}.$$

Such a difference of 13.49 is quite significant for the human eye that can perceive a difference as soon as it is greater than 0.5. It shows how efficient can be the metameric jamming, although there is no perceived difference between the displayed colors Gr1 and Gr2 that are directly displayed using the four primaries according to the invention, even for the majority of people having a visual color deficiency.

In the table 2, the color difference $\Delta E^*$ between the same colors Gr1 and Gr2 is given for different models of camcorder (with their type of video data coding and their type of anti-IR filter); the three values into bracket in the ΔE* column give the digital values $R'_{C.Gr2}$, $G'_{C.Gr2}$, $B'_{C.Gr2}$ of the signals given by the camcorder for the Gr2 color as it is perceived; we assume that, for each camcorder, the balance of white is set to get $R'_{C.Gr1}=G'_{C.Gr1}=B'_{C.Gr1}=128$ for the Gr1 color as it is perceived (full white=255 for the three channels). Some difference between the calculated spectrum and the spectrum that is obtained with real components (Xenon lamp, optical separator) has not been considered in these calculations, as some inaccuracy in the characterization of the camcorders.

TABLE 2

Color Difference for various camcorder.

| Camcorder | Coding | Anti IR filter | ΔE* |
|---|---|---|---|
| Sony TRV15E | PAL | Interferential | 17.77 (162, 163, 141) |
| Sony TRV270e | PAL - | BG type | 15.96 (169, 162, 147) |
| Canon MVX10ei | PAL - numeric | BG type | 19.30 (167, 166, 141) |
| Canon Obtura 500 | NTSC | BG type | 14.72 (171, 163, 156) |
| Camera JVC 3CCD - C mount | PAL | BG type | 26.43 (162, 163, 121) |
| JVC 3 CCD pro | Pro numeric | BG type | 13.49 (161, 150, 133) |
| Canon EOS 20D reflex | Jpeg - Raw | BG type | 18.79 (181, 144, 135) |
| Olympus Bridge camera C5050z | Jpeg - Raw | Interferential | 22.36 (172, 175, 148) |

We can see from all these results that the color difference between Gr1 and Gr2 is quite significant, whatever is the capture device.

We will now give more details about the display device which can implement the invention, mainly focusing on projection display devices.

Examples of Projection Displays to Implement the Invention

Figure 11:
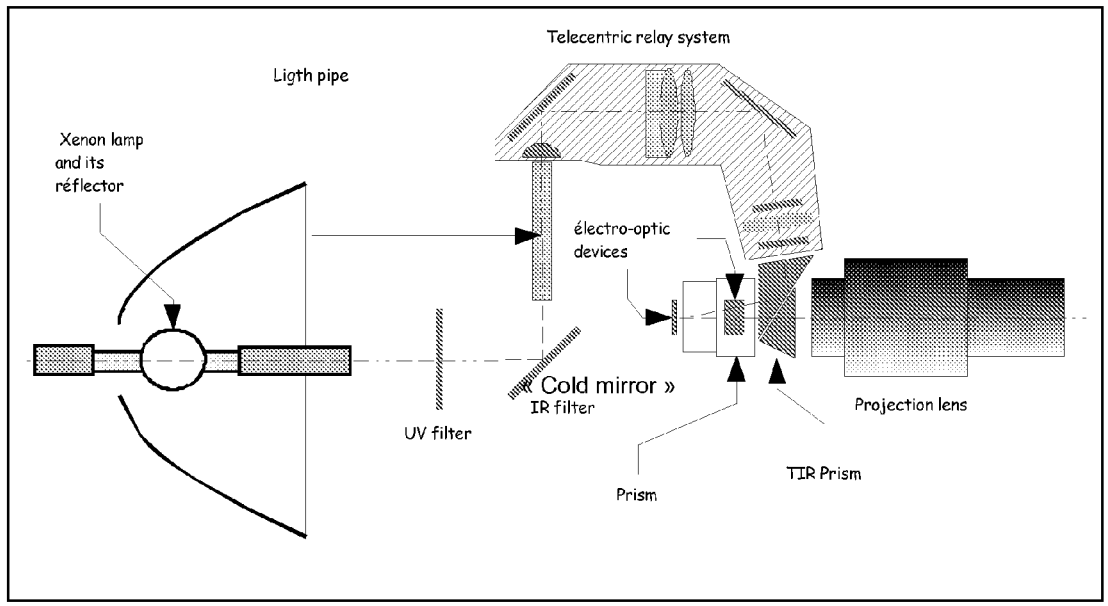
FIG. 11 shows the architecture of a usual projection display device of the prior art with a spatial distribution of primaries.

FIG. 11 represents a digital projection display device with a spatial distribution of primaries; it comprises a Xenon arc lamp and its reflectors as a light source, a system to filter the infra-red and the ultraviolet rays, a light pipe, a relay system that is telecentric, a prism with total internal reflection (TIR), an optical separator/recombinator with three primary channels (prism—only one channel is illustrated), the three electro-optical devices that are usual imagers with micromirrors, and the projection lens. The spectrum of exit of such a prior art projection display device with three primaries red, green and blue is quite usual.

Figure 12:
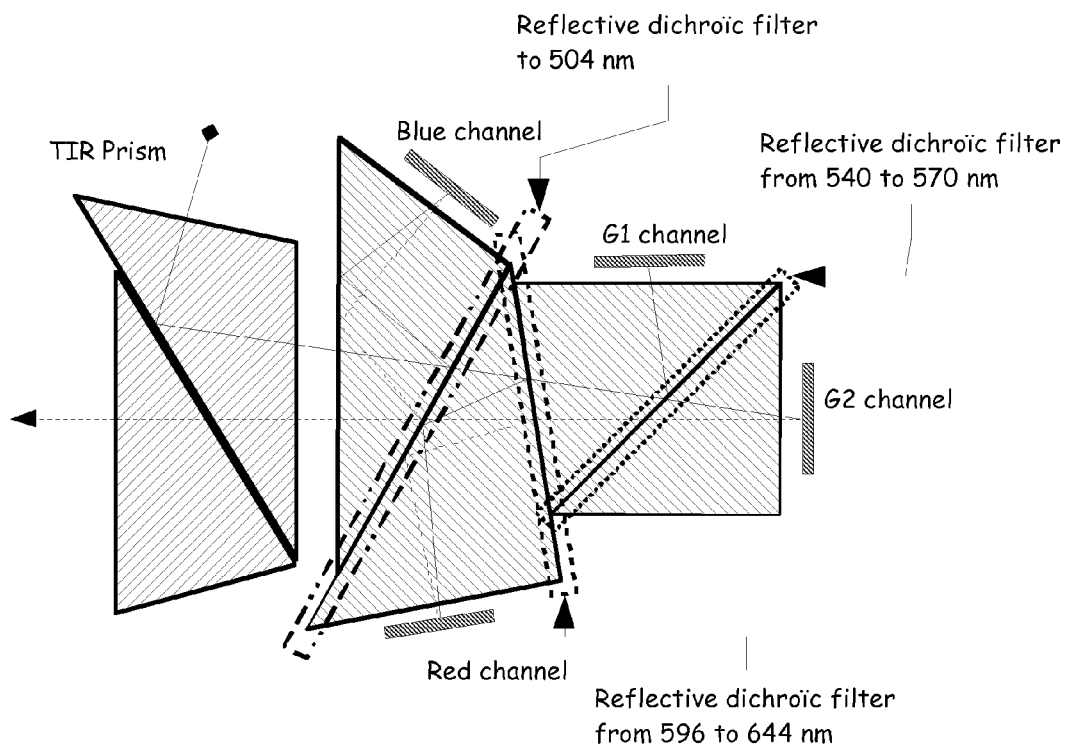
FIG. 12 shows a optical separator/recombinator optical that is adapted to split the light emitted by a source into four different beams and that may be incorporated into the projection display device of FIG. 11 to get a first embodiment of a display device according to the invention.

FIG. 12 illustrates an optical separator/recombinator with four primary channels Red, G1, G2, Blue that may be incorporated in the projection display device of FIG. 11 to get a first embodiment of a display device implementing the invention. This optical separator/recombinator is adapted to split the light emitted by the source into four different beams; each beam is then spatially modulated by a specific micro-imager to get the displayed image. Other embodiments of separators and/or recombinators with four primary channels are disclosed in U.S. Pat. No. 6,885,403.

The right side of this optical separator/recombinator with four channels comprises four elementary prism that are separated by dichroic filters:

a first reflective dichroïc filter from the UV to 504 nm with the interface of the first and the second elementary prisms, a second reflective dichroïc filter from 596 to 644 nm with the interface of second and third elementary prisms, a third reflective dichroïc filter from 540 to 620 nm with the interface of the third and the fourth elementary prism.

According to this architecture, wavelengths that do not go into the blue channel (from UV to 504 nm), neither into the red channel (from 596 nm to 644 nm), and neither into the first green channel G1 (from 540 nm to 596 nm) go indeed into a fourth channel G2 towards a fourth electro-optical component. The wavelengths that do not go into the red neither into the blue channel are distributed on two bands, one from 504 to 540 nm and beyond 644 nm towards the infra-red. A notch filter is intercalated in the optical way (notch of 570 nm to IR to remove the wavelength band from 570 to 596 nm. The spectral distribution at the exit of the projector will then approach the spectrum shown in FIG. 2. In practice according to the gauges of the filters and the tolerances, it could be necessary to slightly change the cutting wavelengths of the filters.

The advantage of such a display device according to the invention are the followings:

The whole range of wavelength emitted by the light source is actually used,

A great freedom of coding is obtained,

The display device is used like a four primaries projector,

An increase in the gamut is directly carried out, by principle.

Figure 13:
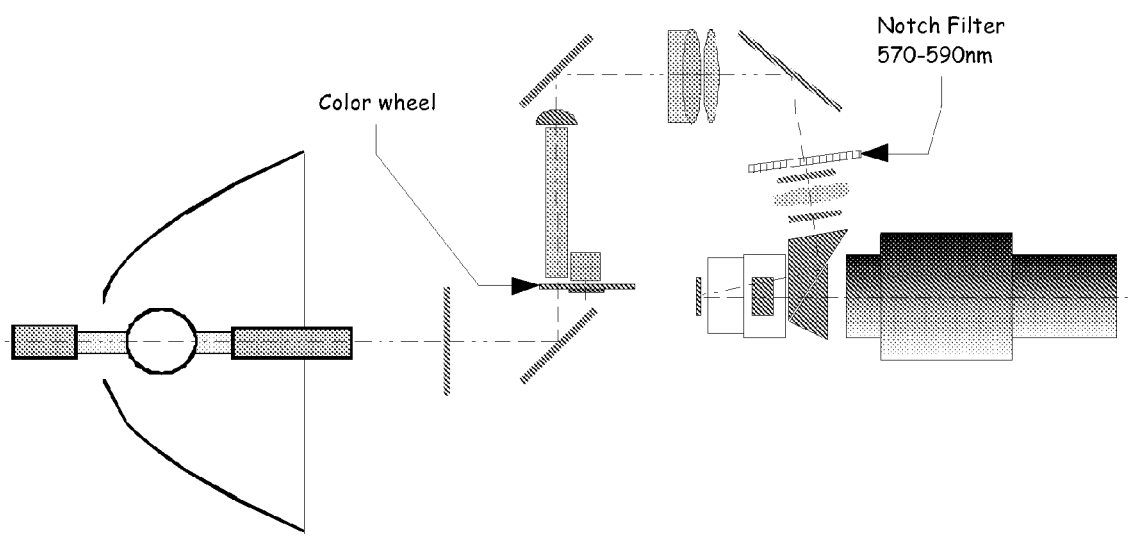
FIG. 13 shows the architecture of a projection display device according to a second embodiment of the invention, with a sequential distribution of primaries which is performed by a color wheel.
Figure 14:
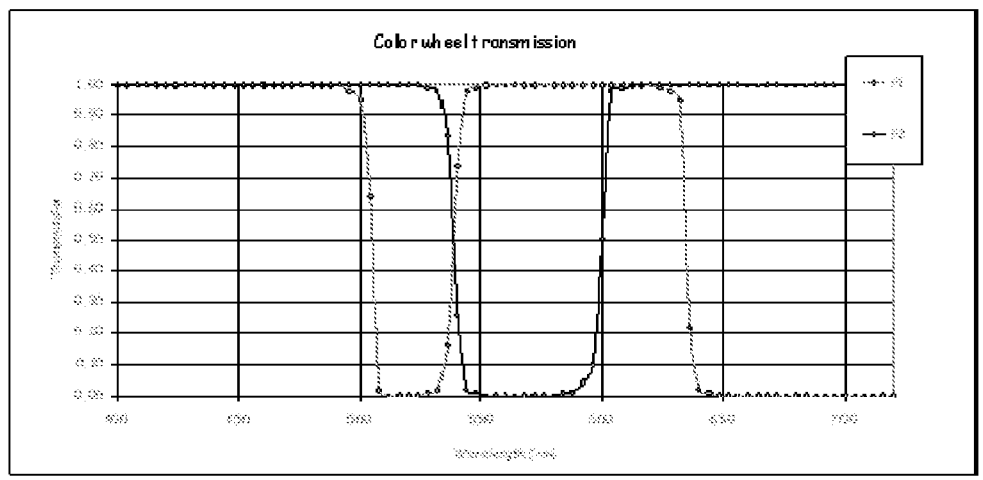
FIG. 14 illustrates the transmission of the different segment filters F1 and F2 of the color wheel of the projection display device of FIG. 13.
Figure 15:
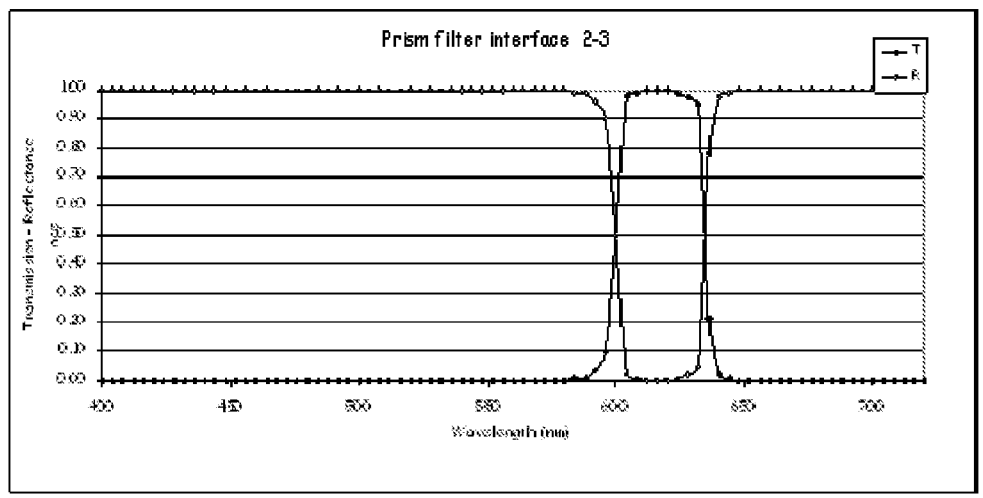
FIG. 15 illustrates the transmission of an "prism filter" that belongs to the projection display device of FIG. 13.

FIG. 13 illustrates a second embodiment of a display device implementing the invention with a sequential (or temporal) distribution of the different primaries: in the projection display device of FIG. 11, a rotating color wheel with two filter sectors is added at the input of the light pipe. The display device also comprises a so-called "prism filter" having a spectral transmission curve illustrated on FIG. 15, and positioned at the interface between the second and the third prism ("interface 2-3"). The spectrums of transmission of the filters of the color wheel are given in FIG. 14. The F1 filter transmits wavelengths from UV to 504 nm (blue channel), does not transmit from 504 nm to 540 nm ("notch band"), transmits again from 540 nm to 640 nm, then does not transmit above 640 nm; the F1 filter then provides both the G1 channel and the Red channel that are then separated by the prism filter. The F2 filter transmits wavelengths from UV to 540 nm, does not transmit from 540 nm to 600 nm, and then transmits above 600 nm up to the IR wavelengths; the F2 filter then provides both the G2 channel, including the "deep" red, and the Blue channel.

The advantage of such a projection display device according to the invention are the followings:

No change in the optical geometry, as compared with projection device of the prior art;

The projection display device can be used as a four primaries projector.

Increase in the gamut directly carried out by principle,

No mechanical change around the optical separator.

Figure 16:
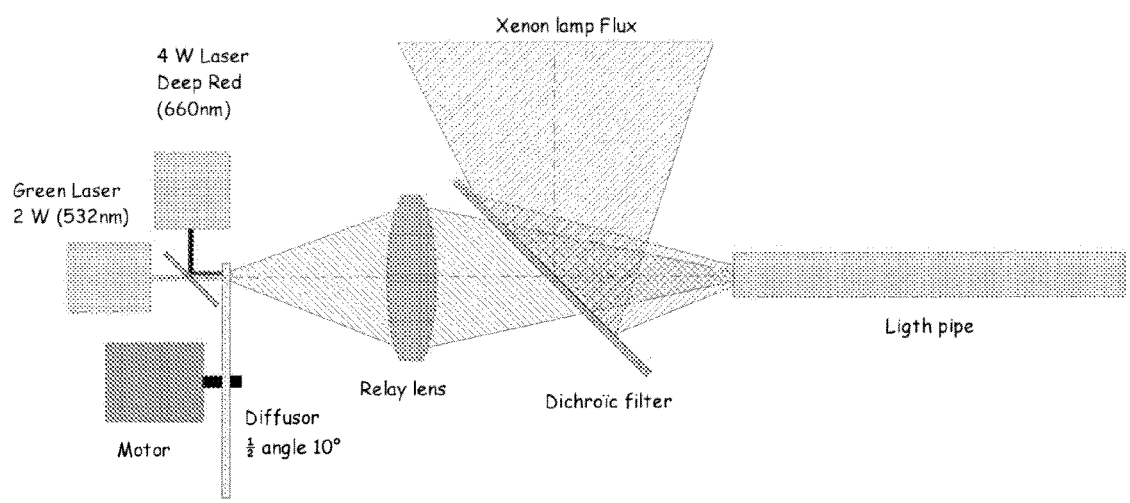
FIG. 16 shows the architecture of a projection display device according to a third embodiment of the invention, having complementary light sources that are laser sources.

FIG. 16 illustrates a third embodiment of a display device implementing the invention, which uses basically a prior art architecture of a projection device according to the first embodiment ("four different primary channels") or to the second embodiment ("sequential distribution of the primaries"); the "cold mirror" of FIG. 13 is replaced by a dichroic filter that is able to reflect light coming from the light source of FIG. 13 ("xenon lamp flux) and to transmit wavelengths at least around 532 nm and around 660 nm; a green laser able to emit at about 532 nm and a deep red laser able to emit at about 660 nm are added as complementary light sources; see also document U.S. Pat. No. 5,526,063 which discloses a projection display with a complementary laser source; the rays of these two complementary light sources are then mixed (for example, by using a dichroïc filter) and then hit a rotating diffuser having a scattering angle of about 10°; the diffuser is driven in rotation by a motor to remove the so-called speckle that is known as the usual defect of laser in a projection device. At exit the diffuser, the solid angle of the beam of the global complementary light source is refracted towards the entry of the light pipe using a relay lens through the dichroïc filter already mentioned.

The advantage of such a projection display device is the possibility to use a projection device with a prior art architecture with only a few modifications.

It can thus be appreciated that the present invention improves upon the prior art by providing a method to display images that allow the jamming of illegal copy without degradation of the quality of display for a very large majority of viewers, thanks to its specific four primaries.

It will be understood that the present invention has been described purely by way of example, and modifications of detail can be made without departing from the scope of the invention.

Each feature disclosed in the description and (where appropriate) the claims and drawings may be provided independently or in any appropriate combination.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

Reference numerals appearing in the claims are by way of illustration only and shall have no limiting effect on the scope of the claims.

The invention claimed is:

1. Method to display an image or a series of images using four or more different primaries having different spectral distributions wherein, in the LMS color space, at least two of these primaries have the same L coordinates and the same M coordinates.

2. Method according to claim 1 wherein all said primaries except two of them have the same L coordinates and the same M coordinates.

3. Method according to claim 1 wherein, in said LMS color space, said primaries having the same L coordinates and the same M coordinates do not have the same S coordinates.

4. Method according to claim 1, wherein it comprises the processing of portions of said image or series of images such that visually equivalent metameric colors in two or more of these portions are displayed by using different combinations of said primaries that differ globally in their spectral distribution.

5. The method according to claim 1, wherein-said processing includes temporally varying the spectral content of time sequential multiple frames.

6. The method according to claim 1, wherein said processing includes both spatially varying the spectral content across the visual image and temporally varying the spectral content of time sequential multiple frames.

7. Display device comprising four or more primaries having different spectral distribution, that is able to implement a method according to claim 1, wherein, in the LMS color space, at least two of these primaries have the same L coordinates and the same M coordinates.

8. Display device according to claim 7 wherein all said primaries except two of them have the same L coordinates and the same M coordinates.

9. Projection display device according to claim 7 wherein it comprises at least one light source and an optical separator/recombinator that is adapted to spatially split the light emitted by the at least one source into four or more different beams, each beam having the spectral distribution of one primary.

10. Projection display device according to claim 9 wherein the optical separator/recombinator comprises three dichroïc filters.

11. Projection display device according to claim 7 wherein it comprises at least one light source, at least one spatial modulator, and a color wheel that is adapted to sequentially distribute the light emitted by the at least one light source on the at least one spatial modulator according to a sequence comprising a plurality of said primaries.

12. Projection display device according to claim 9, wherein the at least one light source comprise a plurality of light sources including at least a laser source.

* * * * *